A. W. BRAUN.
CHEESE MOLD.
APPLICATION FILED JAN. 20, 1922.

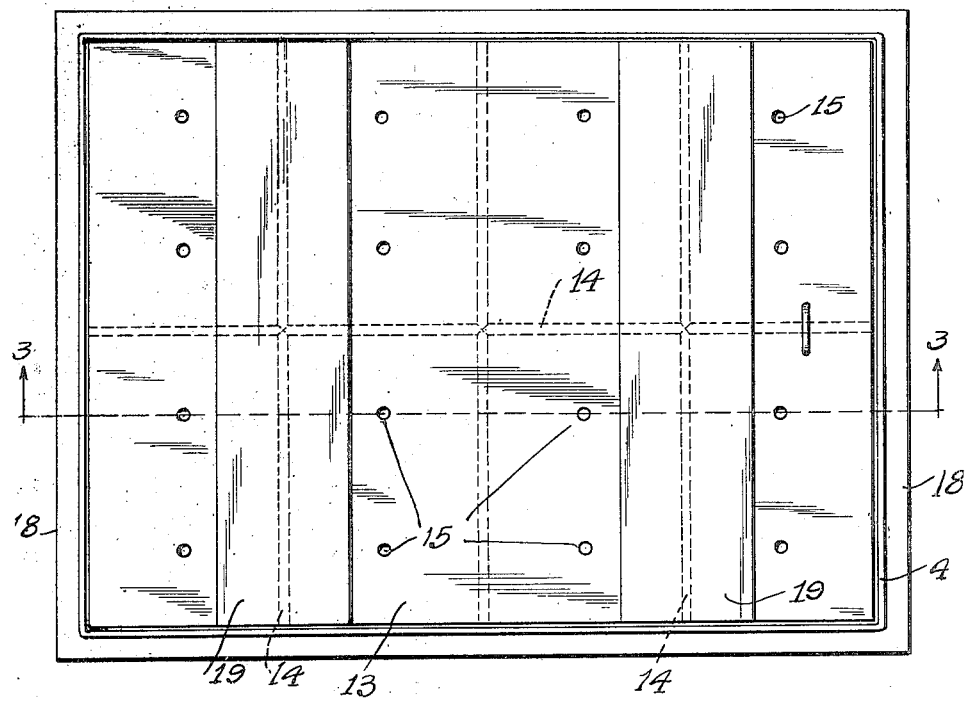
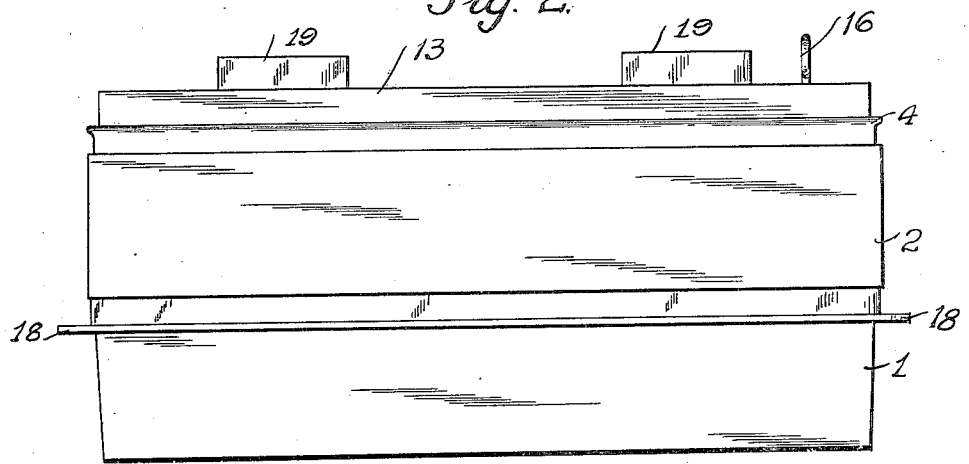

1,430,934.

Patented Oct. 3, 1922.
3 SHEETS—SHEET 2.

Inventor
A. W. BRAUN
By Lester L. Sargent
Attorney

A. W. BRAUN.
CHEESE MOLD.
APPLICATION FILED JAN. 20, 1922.
1,430,934.
Patented Oct. 3, 1922.
3 SHEETS—SHEET 3.
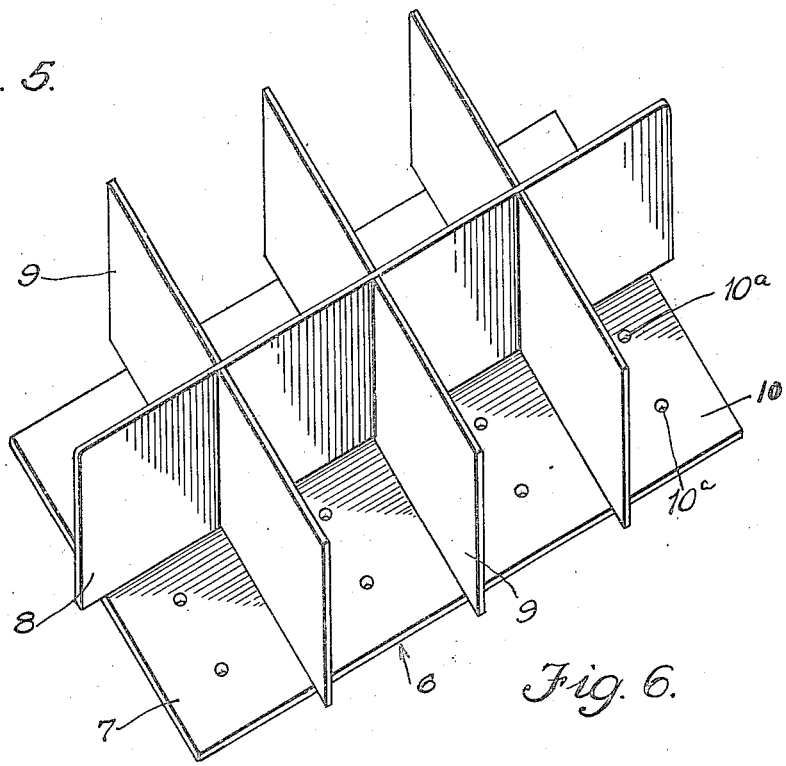
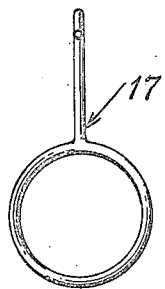
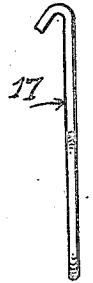
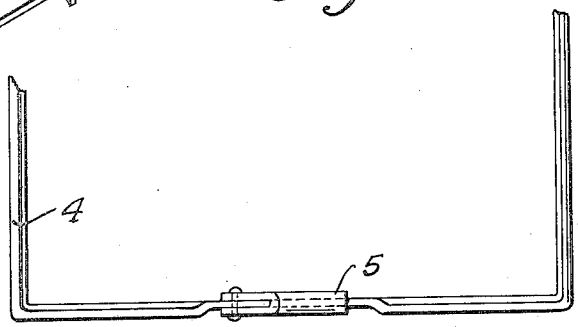
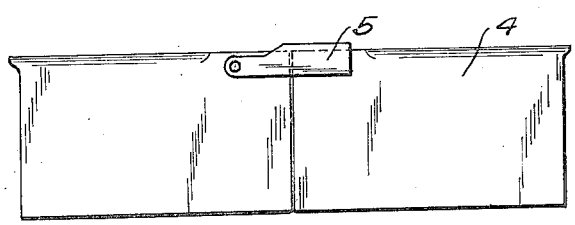
Inventor
A. W. BRAUN
By Lester L. Sargent, Attorney Patented Oct. 3, 1922.

1,430,934

UNITED STATES PATENT OFFICE.

ALBERT W. BRAUN, OF PLATTEVILLE, WISCONSIN.

CHEESE MOLD.

Application filed January 20, 1922. Serial No. 530,519.

*To all whom it may concern:*

Be it known that I, ALBERT W. BRAUN, a citizen of the United States, residing at Platteville, in the county of Grant and State of Wisconsin, have invented a new and useful Cheese Mold, of which the following is a specification.

The object of my invention is to provide a novel cheese mold for making in a single mold cheeses of various size, and of a shape best adapted for wrapping in packages; and to provide a novel combination and arrangement of parts in a cheese mold for the purpose described. I attain these and other objects of my invention by the mechanism illustrated in the accompanying drawings, in which:—

Figure 1 is a top plan of the mold with the weight block or follower in place;

Fig. 2 is a side elevation of same;

Fig. 5 is a perspective view of the lower section tray or mold;

Fig. 6 is a detail top plan of a portion of the bandager;

Fig. 7 is a face view of hook 17;

Fig. 8 is an edge view of same, and

Fig. 9 is a side view of the bandager.

Like numerals designate like parts in each of the several views.

Figure 3:
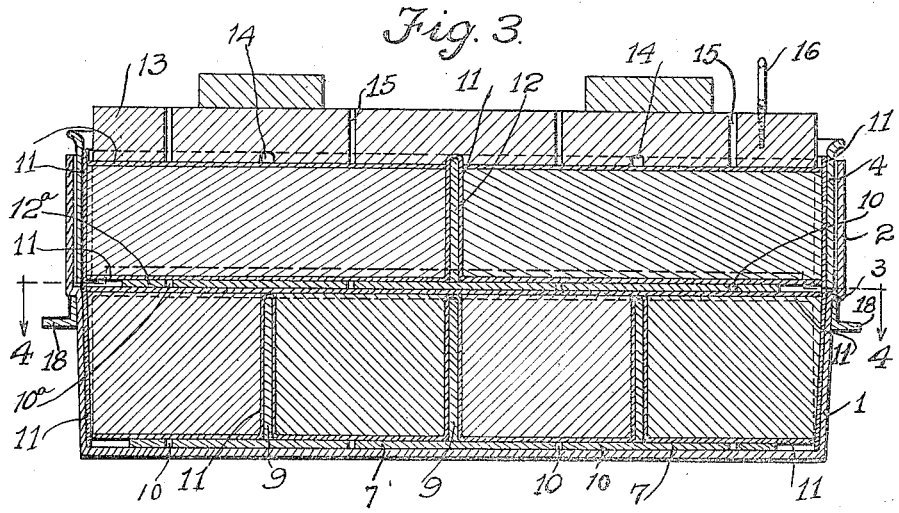
Fig. 3 is a longitudinal section on line 3—3 of Fig. 1.
Figure 4:
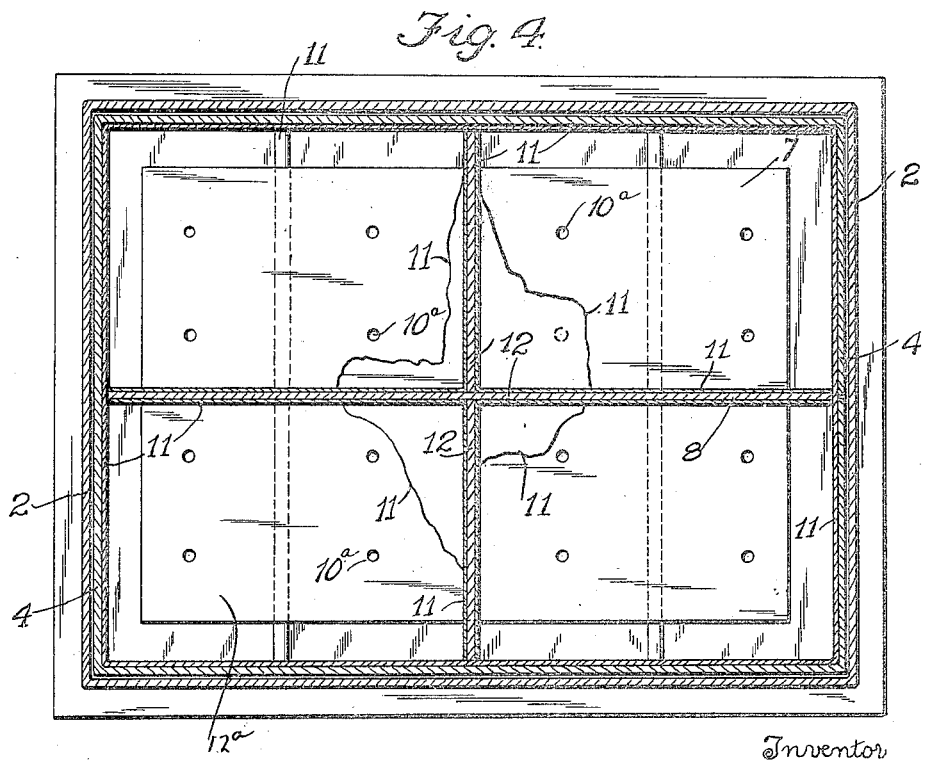
Fig. 4 is a horizontal section on line 4—4 of Fig. 3.

Referring to the accompanying drawing, I provide a cheese mold or form 1 having a slightly enlarged upper section 2, as shown in Fig. 3, the mold having a ridge extending horizontally around the interior of the mold at the base of the upper section and dividing the upper section 2 from the lower section 1. I provide a suitable bandager 4 of thin sheet metal, the bandager having its free ends releasably held together by the clasp 5, as shown in Figs. 6 and 9. For the purpose of dividing the mold into a suitable number of small compartments of the size which it is desired the cheese shall be when made, I provide a suitable lower section mold or partitioning member 6 having one or more longitudinal partitions 8 and any desired plurality of transverse partitions 9, the top of these partitions extending to a plane substantially aligned with the ridge 3 that divides the upper and lower sections of the main mold or frame element, as shown in Figs. 3 and 4. The lower section mold 6 has a base 7, on which the partitions 8 and 9 are affixed; and it is also provided with perforations 10, suitably spaced apart, as shown in Fig. 4. I provide an upper mold section or partition member 12 having any suitable number of longitudinal and transverse partitions, said partitions being affixed on a base $12^a$. I provide a suitable wood block 13 having reinforcing strips 19. Block 13 is provided with longitudinal and transverse grooves arranged to correspond with the partitions strips of the particular upper or lower section mold having the greater number of partitions, so that the block may engage over either of these section or partitioning molds and receive the free edges of the partitions in the grooves 14, as shown in Fig. 3. Block 13 is provided with perforations 15 suitably spaced apart and aligned with the perforations $10^a$ and 10 of the upper section mold and lower section mold respectively. Block 13 is provided with a suitable screw eye 16 to facilitate removal of the block by means of a suitable hook 17. The mold 1 is provided also with an exterior encircling flange 18 for convenience in handling the mold in a press.

In using the invention the lower section mold 6 is placed in the mold or frame 1 and suitable cloth strips 11 are arranged in the mold so as to form a complete lining to receive the cheese with which the compartments of the lower section mold are filled. The metal bandager 4 is placed in the enlarged upper section 2 of the main mold frame 1, and the upper section mold 12 is placed within the bandager and suitable cloth strips 11 are arranged in this upper section mold to form a complete lining for same and the cheese is placed in the compartments of the upper section mold and the wood block applied, its grooves 14 engaging over the free edges of the partition member, as shown. After the cheese has been pressed for the required period of time in the mold it is taken out of the hoop or bandager 4 in one block, and the upper section mold 12 is then removed from the cheese. The wrapping cloth on the bottom of the cheese is turned back just enough to let the section mold slide out. The lower section mold and the cheese in it are taken out as a single unit. After three days on the curing shelf all the cloth is taken off and the cheese dipped in hot paraffin and put in cartons. The wrapping cloth strips 11 are washed and used again. There is no bandage cloth on the cheese when ready for market. The device permits of making the cheese in any desired size, and in different sizes in the same main mold. By reason of the arrangement and number of grooves 14 in the bottom surface of the wood block 13, this block may be applied to either the upper or the lower section mold, depending on the quantity of cheese to be manufactured, or the size desired.

What I claim is:

1. In a device for making package cheese of any desired size in a mold frame, the combination of a mold frame having an upper section and a lower section, the upper section being of slightly greater capacity than the lower section, the mold frame having a dividing ridge between said sections, a lower partitioning member having the free edges of its partitions substantially on the plane with the dividing line between the upper and lower sections of the main mold frame, an upper partitioning member having partition elements, and a block having grooves on its bottom surface suitably arranged to permit of the block being fitted over either the upper or the lower partitioning members.

2. In a cheese mold, the combination of a main frame having an upper section of slightly greater capacity than the lower section, a divided metal bandager for the cheese in the upper section, said bandager being removably mounted in said upper section of the main frame, a plurality of partitioning elements independently removable from the main frame, each of these partitioning elements consisting of any desired number of longitudinal and transverse partitions and a perforated base member on which said partitions are affixed.

3. In combination with the device described in claim 2, a wood block having grooves arranged to correspond with the partitioning member having the greater number of partitions, whereby the block may be mounted on either the upper or lower partitioning member, the block having perforations aligned with the perforations of the partitioning members.

ALBERT W. BRAUN.